(12) United States Patent
Yamashita et al.

(10) Patent No.: US 7,215,484 B2
(45) Date of Patent: May 8, 2007

(54) ZOOM LENS

(75) Inventors: Atsushi Yamashita, Sagamihara (JP); Shinsuke Nobe, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/343,037

(22) Filed: Jan. 30, 2006

(65) Prior Publication Data
US 2006/0181781 A1 Aug. 17, 2006

(30) Foreign Application Priority Data
Feb. 15, 2005 (JP) .............................. 2005-037172

(51) Int. Cl.
*G02B 15/14* (2006.01)
(52) U.S. Cl. ..................... 359/682; 359/689; 359/740; 359/716; 359/753; 359/781; 359/784
(58) Field of Classification Search ................ 359/676, 359/680–682, 689, 740, 716, 753, 781, 784
See application file for complete search history.

(56) References Cited

U.S. PATENT DOCUMENTS 5,835,272 A * 11/1998 Kodama ..................... 359/682
6,320,698 B1 * 11/2001 Suzuki ....................... 359/686
6,563,644 B2 * 5/2003 Suzuki ....................... 359/689
6,606,204 B2 * 8/2003 Toyama ...................... 359/689
6,900,947 B2 * 5/2005 Nakatani et al. ............ 359/689
7,042,651 B2 * 5/2006 Kuba et al. ................. 359/682
7,050,242 B2 * 5/2006 Adachi ....................... 359/689
2003/0142411 A1 * 7/2003 Morooka .................... 359/689
2003/0197951 A1 * 10/2003 Nanba et al. ............... 359/689
2003/0210471 A1 * 11/2003 Mihara et al. .............. 359/689
2006/0056045 A1 * 3/2006 Yoshitsugu ................. 359/680
2006/0056067 A1 * 3/2006 Yanai et al. ................. 359/754
2006/0072212 A1 * 4/2006 Nanba et al. ............... 359/689

FOREIGN PATENT DOCUMENTS

JP 2004-325975 11/2004

* cited by examiner

*Primary Examiner*—Evelyn A. Lester
(74) *Attorney, Agent, or Firm*—Cohen Pontani Lieberman & Pavane LLP

(57) ABSTRACT

A zoom lens system includes a first lens group which has a negative refractive power, a second lens group which has a positive refractive power, and a third lens group which has a positive refractive power in this order from the object side and changes the distances among these lens groups to vary the power from the wide-angle end to the telephoto end. The second lens group has a three-element cemented lens including a positive lens c1, a negative lens c2, and a positive lens c3.

19 Claims, 12 Drawing Sheets

FIG. 2 (a-1) 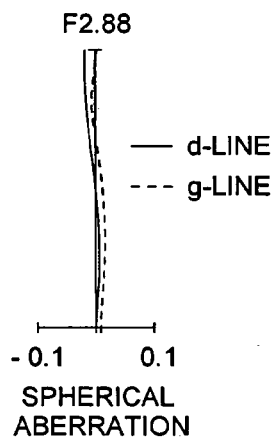
SPHERICAL ABERRATION
FIG. 2 (a-2) 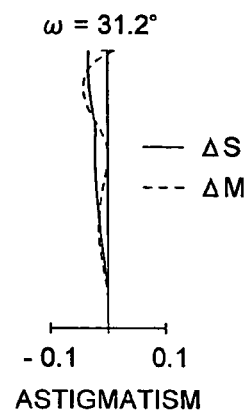
ASTIGMATISM
FIG. 2 (a-3) 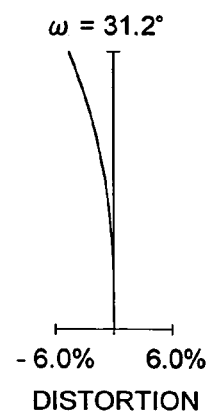
DISTORTION
FIG. 2 (b-1) 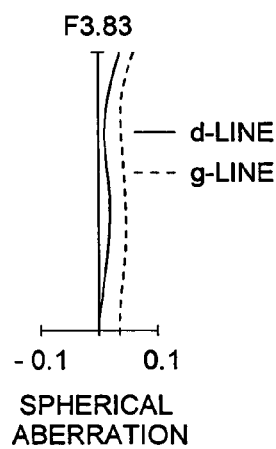
SPHERICAL ABERRATION
FIG. 2 (b-2) 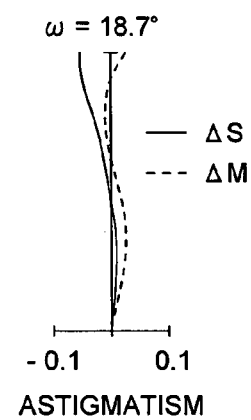
ASTIGMATISM
FIG. 2 (b-3) 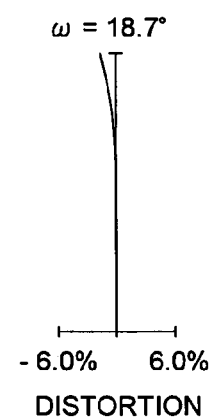
DISTORTION
FIG. 2 (c-1) 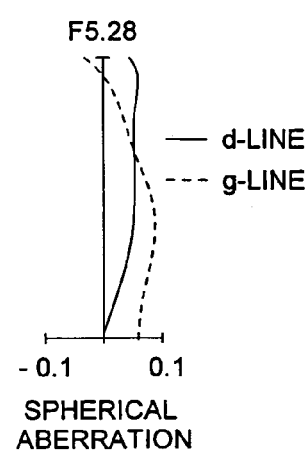
SPHERICAL ABERRATION
FIG. 2 (c-2) 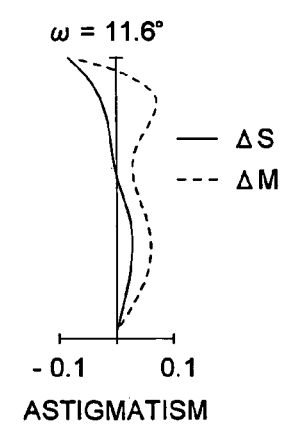
ASTIGMATISM
FIG. 2 (c-3) 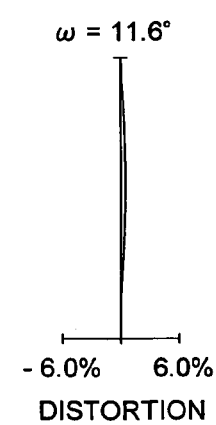
DISTORTION

FIG. 4 (a-1)
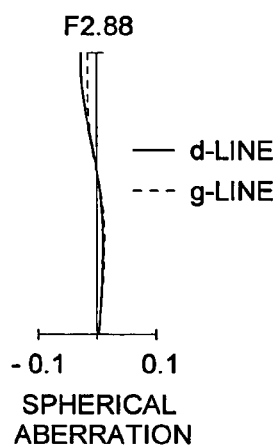
F2.88
— d-LINE
--- g-LINE
-0.1   0.1
SPHERICAL ABERRATION
FIG. 4 (a-2)
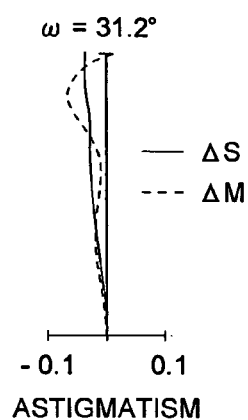
ω = 31.2°
— ΔS
--- ΔM
-0.1   0.1
ASTIGMATISM
FIG. 4 (a-3)
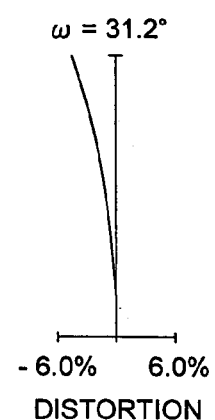
ω = 31.2°
-6.0%   6.0%
DISTORTION
FIG. 4 (b-1)
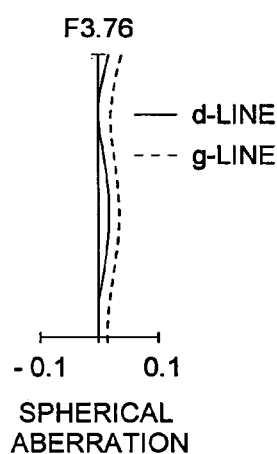
F3.76
— d-LINE
--- g-LINE
-0.1   0.1
SPHERICAL ABERRATION
FIG. 4 (b-2)
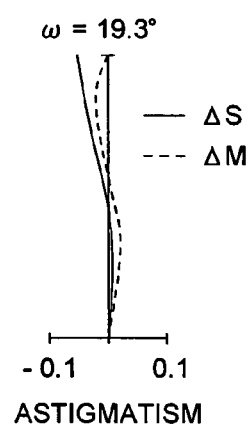
ω = 19.3°
— ΔS
--- ΔM
-0.1   0.1
ASTIGMATISM
FIG. 4 (b-3)
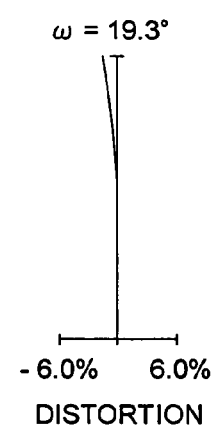
ω = 19.3°
-6.0%   6.0%
DISTORTION
FIG. 4 (c-1)
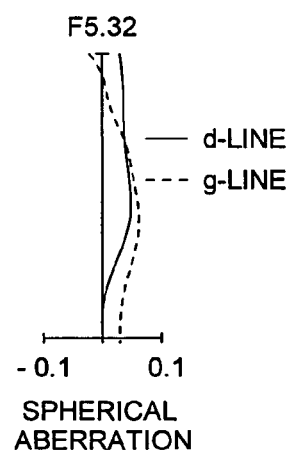
F5.32
— d-LINE
--- g-LINE
-0.1   0.1
SPHERICAL ABERRATION
FIG. 4 (c-2)
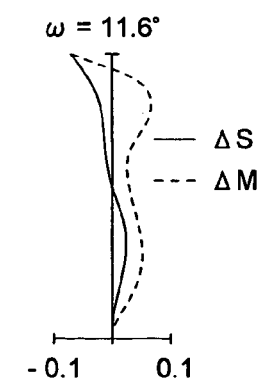
ω = 11.6°
— ΔS
--- ΔM
-0.1   0.1
ASTIGMATISM
FIG. 4 (c-3)
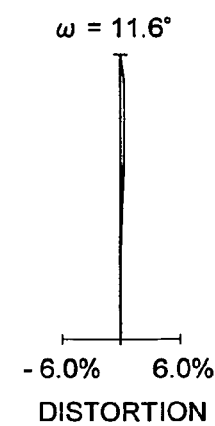
ω = 11.6°
-6.0%   6.0%
DISTORTION

FIG. 6 (a-1)
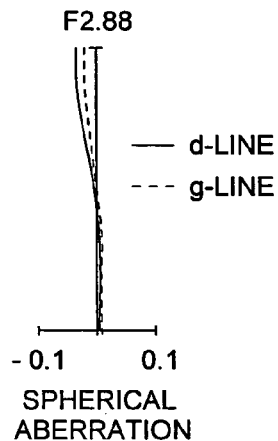
F2.88
— d-LINE
--- g-LINE
-0.1   0.1
SPHERICAL ABERRATION
FIG. 6 (a-2)
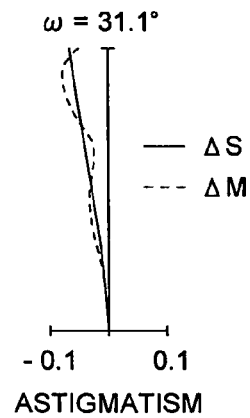
ω = 31.1°
— ΔS
--- ΔM
-0.1   0.1
ASTIGMATISM
FIG. 6 (a-3)
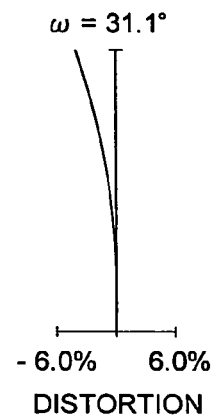
ω = 31.1°
-6.0%   6.0%
DISTORTION
FIG. 6 (b-1)
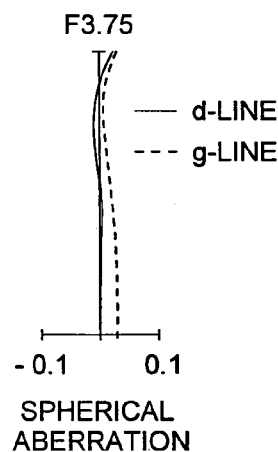
F3.75
— d-LINE
--- g-LINE
-0.1   0.1
SPHERICAL ABERRATION
FIG. 6 (b-2)
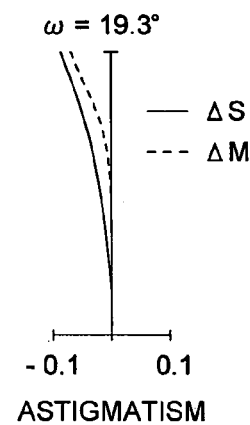
ω = 19.3°
— ΔS
--- ΔM
-0.1   0.1
ASTIGMATISM
FIG. 6 (b-3)
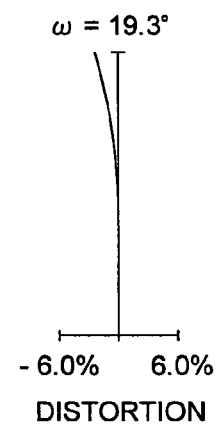
ω = 19.3°
-6.0%   6.0%
DISTORTION
FIG. 6 (c-1)
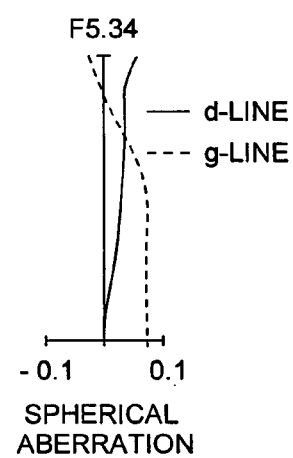
F5.34
— d-LINE
--- g-LINE
-0.1   0.1
SPHERICAL ABERRATION
FIG. 6 (c-2)
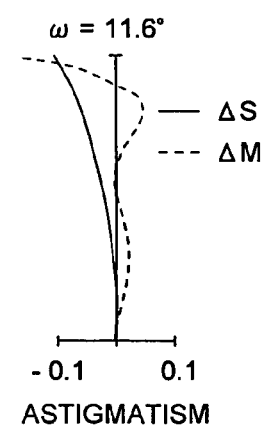
ω = 11.6°
— ΔS
--- ΔM
-0.1   0.1
ASTIGMATISM
FIG. 6 (c-3)
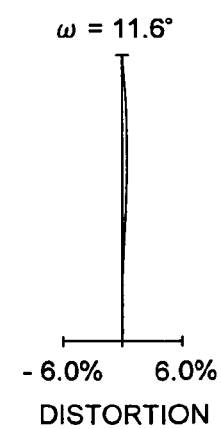
ω = 11.6°
-6.0%   6.0%
DISTORTION

FIG. 8 (a-1)
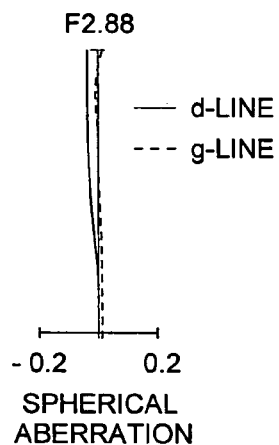
F2.88
— d-LINE
--- g-LINE
-0.2   0.2
SPHERICAL ABERRATION
FIG. 8 (a-2)
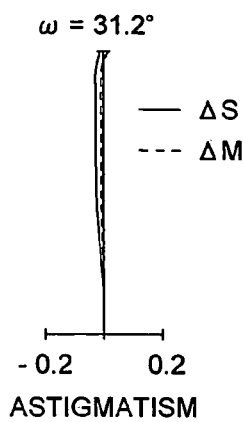
ω = 31.2°
— ΔS
--- ΔM
-0.2   0.2
ASTIGMATISM
FIG. 8 (a-3)
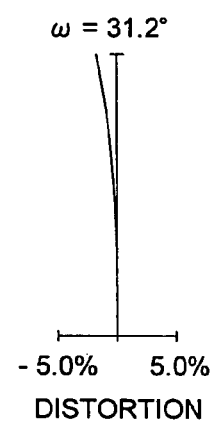
ω = 31.2°
-5.0%   5.0%
DISTORTION
FIG. 8 (b-1)
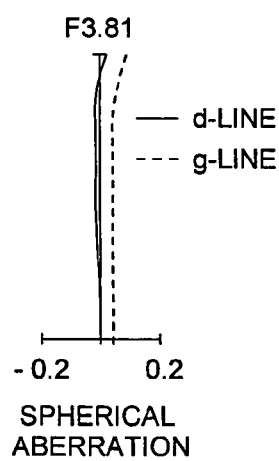
F3.81
— d-LINE
--- g-LINE
-0.2   0.2
SPHERICAL ABERRATION
FIG. 8 (b-2)
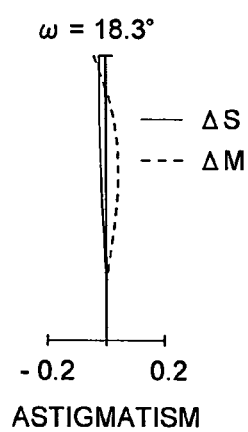
ω = 18.3°
— ΔS
--- ΔM
-0.2   0.2
ASTIGMATISM
FIG. 8 (b-3)
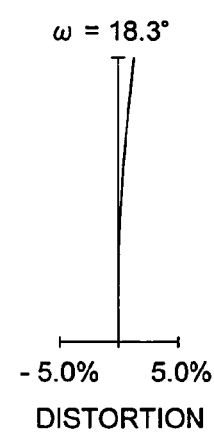
ω = 18.3°
-5.0%   5.0%
DISTORTION
FIG. 8 (c-1)
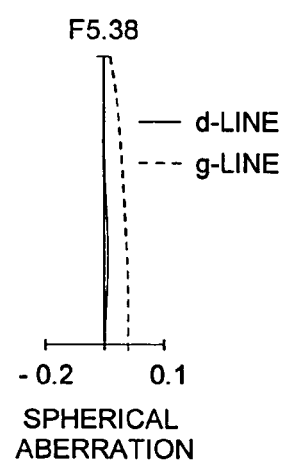
F5.38
— d-LINE
--- g-LINE
-0.2   0.1
SPHERICAL ABERRATION
FIG. 8 (c-2)
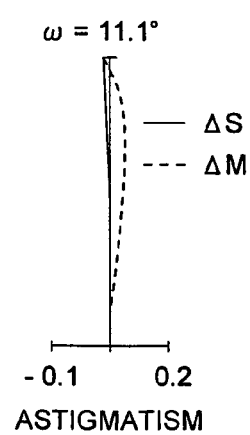
ω = 11.1°
— ΔS
--- ΔM
-0.1   0.2
ASTIGMATISM
FIG. 8 (c-3)
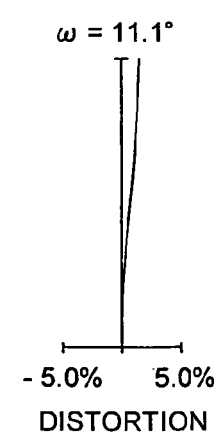
ω = 11.1°
-5.0%   5.0%
DISTORTION

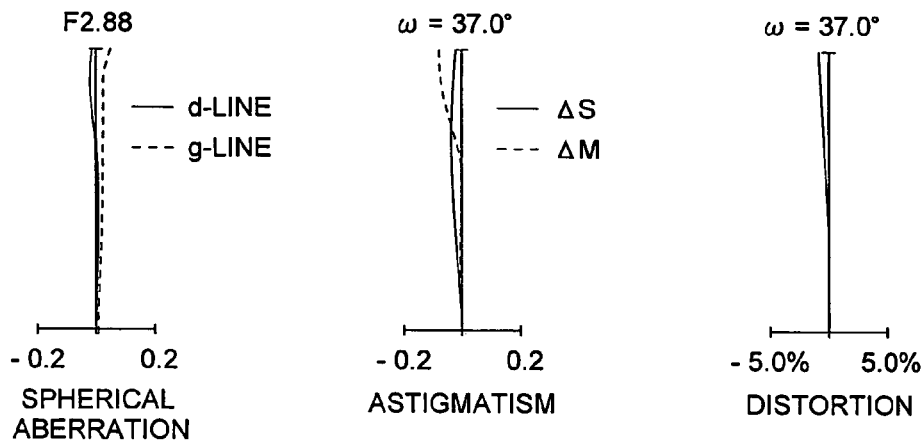
FIG. 10 (a-1)  FIG. 10 (a-2)  FIG. 10 (a-3)
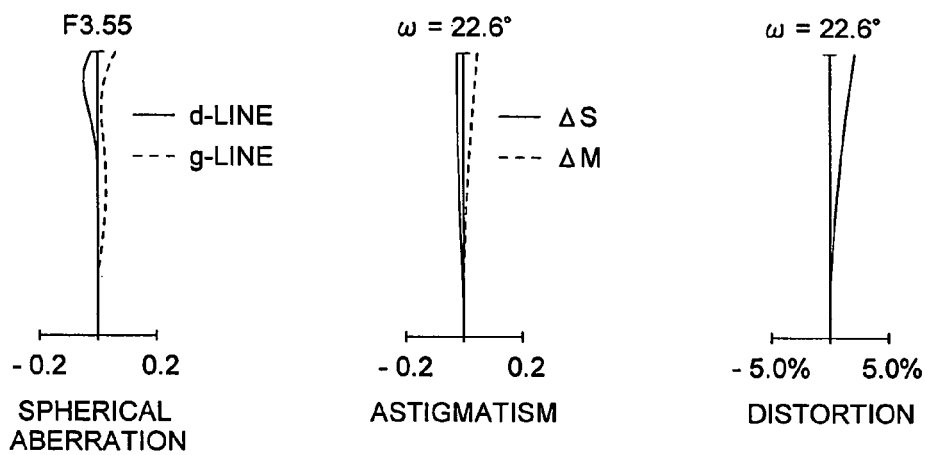
FIG. 10 (b-1)  FIG. 10 (b-2)  FIG. 10 (b-3)
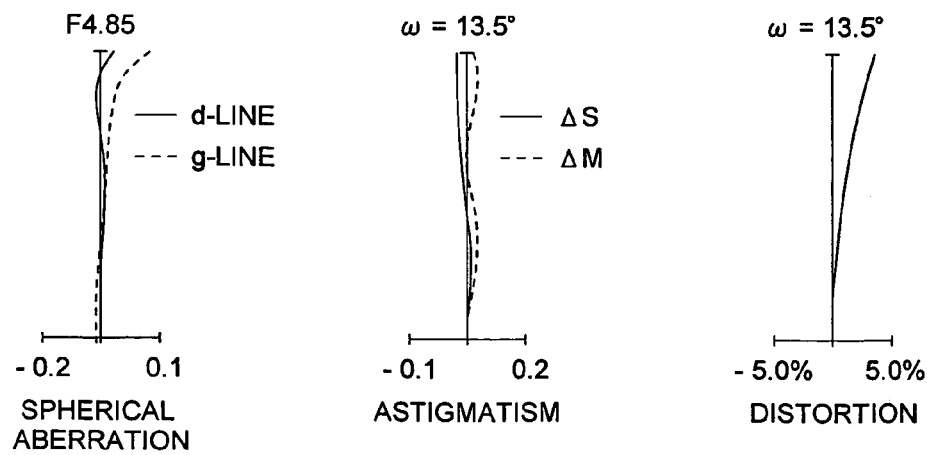
FIG. 10 (c-1)  FIG. 10 (c-2)  FIG. 10 (c-3)

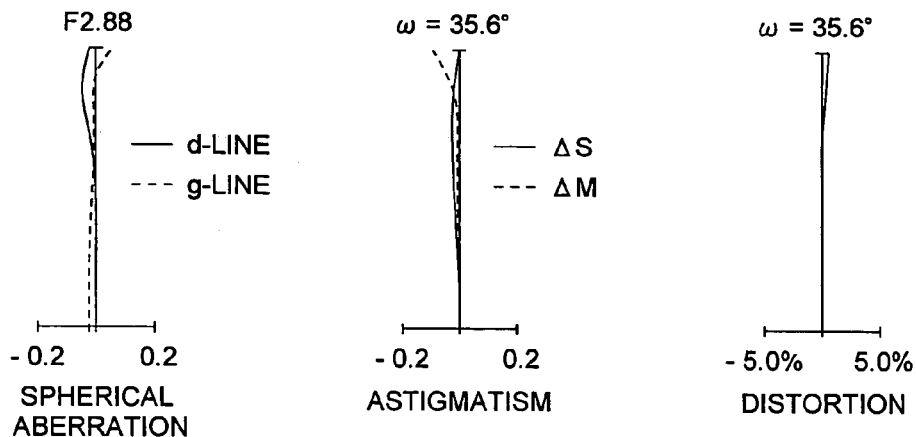
FIG. 12 (a-1)   FIG. 12 (a-2)   FIG. 12 (a-3)
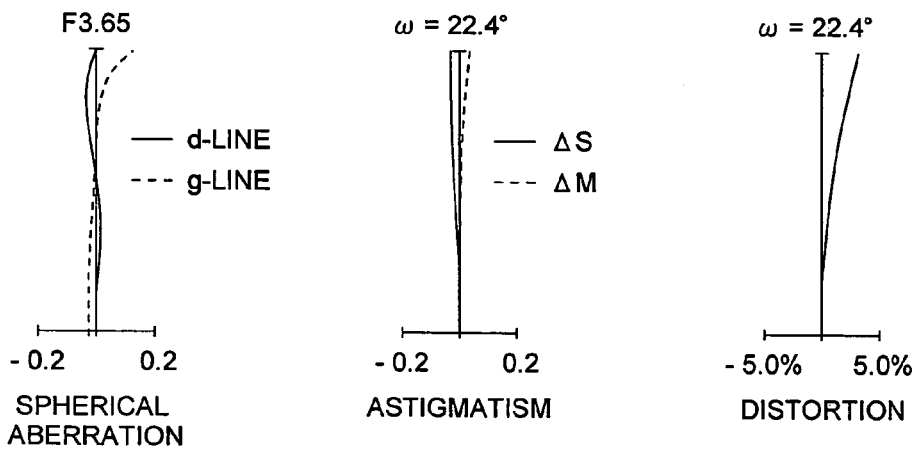
FIG. 12 (b-1)   FIG. 12 (b-2)   FIG. 12 (b-3)
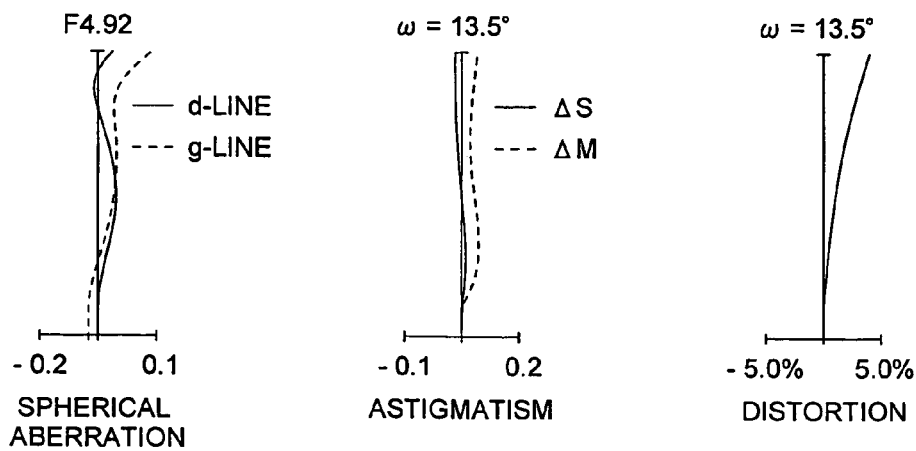
FIG. 12 (c-1)   FIG. 12 (c-2)   FIG. 12 (c-3)

ZOOM LENS

This application is based on Japanese Patent Application No. 2005-037172 filed on Feb. 15, 2005, which is incorporated hereinto by reference.

BACKGROUND OF THE INVENTION

This invention relates to a zoom lens system for a digital camera, video camera or the like, particularly to a compact and axially-thin zoom lens system of, for example, a power variation ratio of 3 and a field angle of 60° or more at a wide-angle end which is fit for CCD (charge coupled device) and CMOS (complementary metal-oxide semiconductor).

Recently, there have been lots of digital still cameras and video camera which use CCDs or CMOSs. Particularly, only thin cameras have enjoyed an increasing demand. A three-element cemented lens system whose axial length is suppressed has been disclosed for such thin cameras. (See Patent Document 1.)

[Patent Document 1] Japanese Non-Examined Patent Publication 2004-325975

The second lens group of the zoom lens system of Patent Document 1 is composed of a positive single lens and a three-element cemented lens system which contains a negative lens, a positive lens, and a negative lens in this order when viewed from the object side. When the second lens group is configured in this manner, the lateral magnification of the three-element cemented lens system cannot avoid from becoming bigger. Therefore, as the lens errors of the lens thickness occur, the paraxial values such as focal lengths and back-focus and aberration changes will be greater. This is a problem.

SUMMARY OF THE INVENTION

An object of this invention is to provide a zoom lens system featuring small lens thickness along the optical axis, wide field angle, high power variation ratio, and well-corrected aberrations. This object can be accomplished by any one of the following Structures 1 to 43.

Structure 1: A zoom lens system comprising a first lens group which has a negative refractive power, a second lens group which has a positive refractive power, and a third lens group which has a positive refractive power in this order when viewed from the object side and changing the distances among these lens groups to vary the power from the wide-angle end to the telephoto end, wherein the second lens group has a three-element cemented lens including a positive lens c1, a negative lens c2 and a positive lens c3.

Structure 2: The zoom lens of Structure 1, wherein the three-element cemented lens satisfies the following conditional expressions:

$$0.05 < n_{c1} - n_{c2} \quad (1)$$

$$5 < v_{c1} - v_{c2} \quad (2)$$

where $n_{c1}$ represents refractive index of the lens c1, $n_{c2}$ represents refractive index of the lens c2, $v_{c1}$ represents Abbe's number of the lens c1, and $v_{c2}$ represents Abbe's number of the lens c2.

Structure 3: The zoom lens of Structure 1, wherein the three-element cemented lens satisfies the following conditional expressions:

$$0.1 < n_{c1} - n_{c2} \quad (3)$$

$$10 < v_{c1} - v_{c2} \quad (4)$$

where $n_{c1}$ represents refractive index of the lens c1, $n_{c2}$ represents refractive index of the lens c2, $v_{c1}$ represents Abbe's number of the lens c1, and $v_{c2}$ represents Abbe's number of the lens c2.

Structure 4: The zoom lens of any one of Structures 1 to 3, wherein the three-element cemented lens satisfies the following conditional expressions:

$$0.05 < n_{c3} - n_{c2} \quad (5)$$

$$5 < v_{c3} - v_{c2} \quad (6)$$

where $n_{c2}$ represents refractive index of the lens c2, $n_{c3}$ represents refractive index of the lens c3, $v_{c2}$ represents Abbe's number of the lens c2, and $v_{c3}$ represents Abbe's number of the lens c3.

Structure 5: The zoom lens of any one of Structures 1 to 3, wherein the three-element cemented lens satisfies the following conditional expressions:

$$0.1 < n_{c3} - n_{c2} \quad (7)$$

$$10 < v_{c3} - v_{c2} \quad (8)$$

where $n_{c2}$ represents refractive index of the lens c2, $n_{c3}$ represents refractive index of the lens c3, $v_{c2}$ represents Abbe's number of the lens c2, and $v_{c3}$ represents Abbe's number of the lens c3.

Structure 6: The zoom lens of any one of Structures 1 to 5, wherein the lens c1 satisfies the following conditional expressions:

$$1.65 < n_{c1} \quad (9)$$

$$35 < v_{c1} \quad (10)$$

where $n_{c1}$ represents refractive index of the lens c1, and $v_{c1}$ represents Abbe's number of the lens c1.

Structure 7: The zoom lens of any one of Structures 1 to 5, wherein the lens c1 satisfies the following conditional expressions:

$$1.75 < n_{c1} \quad (11)$$

$$40 < v_{c1} \quad (12)$$

where $n_{c1}$ represents refractive index of the lens c1, and $v_{c1}$ represents Abbe's number of the lens c1.

Structure 8: The zoom lens of any one of Structures 1 to 7, wherein the lens c2 satisfies the following conditional expressions:

$$n_{c2} < 1.70 \quad (13)$$

$$v_{c2} < 50 \quad (14)$$

where $n_{c2}$ represents refractive index of the lens c2, and $v_{c2}$ represents Abbe's number of the lens c2.

Structure 9: The zoom lens of any one of Structures 1 to 7, wherein the lens c2 satisfies the following conditional expressions:

$$n_{c2} < 1.65 \quad (15)$$

$$v_{c2} < 45 \quad (16)$$

where $n_{c2}$ represents refractive index of the lens c2, and $v_{c2}$ represents Abbe's number of the lens c2.

Structure 10: The zoom lens of any one of Structures 1 to 9, wherein the lens c3 satisfies the following conditional expressions:

$$1.60 < n_{c3} \quad (17)$$

$$40 < v_{c3} \quad (18)$$

where $n_{c3}$ represents refractive index of the lens c3, and $v_{c3}$ represents Abbe's number of the lens c3.

Structure 11: The zoom lens of any one of Structures 1 to 9, wherein the lens c3 satisfies the following conditional expressions:

$$1.70 < n_{c3} \quad (19)$$

$$45 < v_{c3} \quad (20)$$

where $n_{c3}$ represents refractive index of the lens c3, and $v_{c3}$ represents Abbe's number of the lens c3.

Structure 12: The zoom lens of any one of Structures 1 to 11, wherein the three-element cemented lens satisfies the following conditional expression:

$$0.2 \leq f_c/f_2 < 1.2 \quad (21)$$

where $f_c$ represents a focal length of the three-element cemented lens, and $f_2$ represents a focal length of the second lens group.

Structure 13: The zoom lens of any one of Structures 1 to 11, wherein the three-element cemented lens satisfies the following conditional expression:

$$0.4 \leq f_c/f_2 < 1.0 \quad (22)$$

where $f_c$ represents focal length of the three-element cemented lens, and $f_2$ represents focal length of the second lens group.

Structure 14: The zoom lens of any one of Structures 1 to 13, wherein the second lens group comprises the three-element cemented lens and at least one negative lens.

Structure 15: The zoom lens of Structures 1, wherein the three-element cemented lens satisfies the following conditional expressions:

$$0 < n_{c1} - n_{c2} \quad (23)$$

$$5 < v_{c1} - v_{c2} \quad (24)$$

where $n_{c1}$ represents refractive index of the lens c1, $n_{c2}$ represents refractive index of the lens c2, $v_{c1}$ represents Abbe's number of the lens c1, and $v_{c2}$ represents Abbe's number of the lens c2.

Structure 16: The zoom lens of Structures 1, wherein the three-element cemented lens satisfies the following conditional expressions:

$$0.02 < n_{c1} - n_{c2} \quad (25)$$

$$10 < v_{c1} - v_{c2} \quad (26)$$

where $n_{c1}$ represents refractive index of the lens c1, $n_{c2}$ represents refractive index of the lens c2, $v_{c1}$ represents Abbe's number of the lens c1, and $vc_2$ represents Abbe's number of the lens c2.

Structure 17: The zoom lens of Structures 1, 15, or 16, wherein the three-element cemented lens satisfies the following conditional expressions:

$$-0.05 > n_{c3} - n_{c2} \quad (27)$$

$$0 < v_{c3} - v_{c2} \quad (28)$$

where $n_{c2}$ represents refractive index of the lens c2, $n_{c3}$ represents refractive index of the lens c3, $v_{c2}$ represents Abbe's number of the lens c2, and $v_{c3}$ represents Abbe's number of the lens c3.

Structure 18: The zoom lens of Structures 1, 15, or 16, wherein the three-element cemented lens satisfies the following conditional expressions:

$$-0.1 > n_{c3} - n_{c2} \quad (29)$$

$$1 < v_{c3} - v_{c2} \quad (30)$$

where $n_{c2}$ represents refractive index of the lens c2, $n_{c3}$ represents refractive index of the lens c3, $v_{c2}$ represents Abbe's number of the lens c2, and $v_{c3}$ represents Abbe's number of the lens c3.

Structure 19: The zoom lens of Structures 1, 15 to 18, wherein the lens c1 satisfies the following conditional expressions:

$$1.65 < n_{c1} \quad (31)$$

$$35 < v_{c1} \quad (32)$$

where $n_{c1}$ represents refractive index of the lens c1, and $v_{c1}$ represents Abbe's number of the lens c1.

Structure 20: The zoom lens of Structures 1, 15 to 18, wherein the lens c1 satisfies the following conditional expressions:

$$1.75 < n_{c1} \quad (33)$$

$$40 < v_{c1} \quad (34)$$

where $n_{c1}$ represents refractive index of the lens c1, and $v_{c1}$ represents Abbe's number of the lens c1.

Structure 21: The zoom lens of Structures 1, 15 to 20, wherein the lens c2 satisfies the following conditional expressions:

$$1.65 < n_{c2} < 1.85 \quad (35)$$

$$v_{c2} < 50 \quad (36)$$

where $n_{c2}$ represents refractive index of the lens c2, and $v_{c2}$ represents Abbe's number of the lens c2.

Structure 22:

The zoom lens of Structures 11, 15 to 20, wherein the lens c2 satisfies the following conditional expressions:

$$1.70 < n_{c2} < 1.85 \quad (37)$$

$$v_{c2} < 45 \quad (38)$$

where $n_{c2}$ represents refractive index of the lens c2, and $v_{c2}$ represents Abbe's number of the lens c2.

Structure 23: The zoom lens of Structures 1, 15 to 22, wherein the lens c3 satisfies the following conditional expressions:

$$1.70 > n_{c3} \quad (39)$$

$$65 > v_{c3} \quad (40)$$

where $n_{c3}$ represents refractive index of the lens c3, and $v_{c3}$ represents Abbe's number of the lens c3.

Structure 24: The zoom lens of Structures 1, 15 to 22, wherein the lens c3 satisfies the following conditional expressions:

$$1.65 > n_{c3} \qquad (41)$$

$$60 > v_{c3} \qquad (42)$$

where $n_{c3}$ represents refractive index of the lens c3, and $v_{c3}$ represents Abbe's number of the lens c3.

Structure 25: The zoom lens of Structures 1, 15 to 24, wherein the second lens group is composed of the three-element cemented lens only.

Structure 26: The zoom lens of Structures 1, 15 to 25, wherein the lens c3 is a positive meniscus lens with convex surface thereof faced to the object side.

Structure 27: The zoom lens of Structure 1 to 26, wherein the first lens group comprises one negative lens and one positive lens, and has at least one aspheric surface.

Structure 28: The zoom lens of Structure 27, wherein the aspheric surface of the first lens group is a hybrid aspheric surface which has an aspheric plastic layer on a spherical glass surface.

Structure 29: The zoom lens of Structure 27 or 28, wherein the negative lens of the first lens group satisfies the following conditional expression:

$$n_{1n} > 1.80 \qquad (43)$$

where $n_{1n}$ represents refractive index of the negative lens.

Structure 30: The zoom lens of any one of Structures 1 to 29, wherein the second lens group has at least one aspheric surface.

Structure 31: The zoom lens of Structure 30, wherein the aspheric surface of the second lens group is positioned at least closest to the object side of the second lens group.

Structure 32: The zoom lens of Structure 30 or 31, wherein the aspheric surface of the second lens group is positioned at least closest to the image side of the second lens group.

Structure 33: The zoom lens of any one of Structures 1 to 14 and 27 to 32, wherein at least a lens of the second lens group which is closest to an image side is a plastic lens.

Structure 34: The zoom lens of any one of Structures 1 to 30, 32, and 33, wherein the outermost surface of the second lens group which is closest to the object side is spherical.

Structure 35: The zoom lens of Structure 34, wherein the spherical surface of the second lens group is polished.

Structure 36: The zoom lens of any one of Structures 1 to 35, wherein the third lens group comprises one positive lens.

Structure 37: The zoom lens of Structure 36, wherein the positive lens has at least one aspheric surface.

Structure 38: The zoom lens of Structure 36 or 37, wherein the positive lens is made of plastic and satisfies the following conditional expression:

$$0.1 < f_W/f_{3p} < 0.6 \qquad (44)$$

where $f_W$ represents focal length of the entire lens system at the wide-angle end, and $f_{3p}$ represents focal length of the positive lens.

Structure 39: The zoom lens of Structure 36 or 37, wherein the positive lens is made of plastic and satisfies the following conditional expression:

$$0.2 < f_W/f_{3p} < 0.4 \qquad (45)$$

where $f_W$ represents focal length of the entire lens system at the wide-angle end, and $f_{3p}$ represents focal length of the positive lens.

Structure 40: The zoom lens of any one of Structures 1 to 39, wherein the zoom lens satisfies the following conditional expression:

$$0.9 < SD/2Y < 2.0 \qquad (46)$$

where SD represents sum of axial thicknesses of lens groups, and 2Y represents diagonal length of an image-pickup device.

Structure 41: The zoom lens of any one of Structures 1 to 39, wherein the zoom lens satisfies the following conditional expression:

$$1.1 < SD/2Y < 1.8 \qquad (47)$$

where SD represents sum of axial thickness of the lens groups, and 2Y represents diagonal length of the image-pickup device.

Structure 42: The zoom lens of any one of Structures 1 to 41, wherein the zoom lens moves at least the third lens group from an infinity point to a finite distance to focus.

Structure 43: The zoom lens of any one of Structures 1 to 42, wherein the telephoto end of the third lens group is positioned nearer to the image side than the wide-angle end.

In the present invention, as the first lens group has a negative refractive power and the second lens group has a positive refractive power, there can be provided a back focus wide enough to place a low-pass filter, infrared-cut filter, cover glass, and others between the shooting lens and the surface of a CCD. Further, there can be obtained an advantage of taking a great ratio of marginal light amount due to the effect of divergence of this first negative lens group when the aperture stop is located behind the negative lens group. Generally, a zoom lens system for a solid image-pickup device such as CCD is demanded to have telecentricity to get a good light-receiving sensitivity in the whole image area. Telecentricity is a special property of certain multi-element lens by which the chief rays for all points of image heights cross the object go into the imaging surface of the solid image-pickup device with an incident angle as in parallel to the optical axis as possible. Recently, although it has been possible to correct insufficient amount of telecentricity on the image side by placing a micro lens array on the imaging surface of the solid image-pickup device, the telecentricity is still insufficient. When the good telecentricity is assured, the image quality will be improved.

Further, by giving a positive refractive power to the third lens group, the telecentricity can be fully assured which is specifically effective when the image-pickup device is CCD or CMOS. Incidentally, to combine compactness and telecentricity, it is preferable to place the aperture stop on the object side of the second lens group. By using a reflection type infrared-cut filter which is made by coating the surface of a low-pass filter, the thickness of the zoom lens system in the axial direction can be reduced and the compactness of the system can be assured since additional absorption type infrared-cut filter glass is not required.

Since the second lens group of the lens system in this invention has a three-element cemented lens which includes a positive lens c1, a negative lens c2 and a positive lens c3 in this order from the object side, the lens system can suppress lens errors such as decenter and lens interval change lower than those of a lens system of one single lens and two-cemented lenses or a lens system of three single lenses.

Particularly, when the second lens group is made thinner for compactness, the optical performance degradation of the lens system is apt to become greater if the above errors occur. Therefore, the above three-cemented lens system configuration is very effective to minimize such errors.

Next will be explained the meanings of the above conditional expressions. Conditional expressions (1) to (20) and (23) to (42) define relationships between refractive index and chromatic dispersion of each lens which constitutes the three-element cemented lens in the second lens group.

In the case the second lens group comprises a three-element cemented lens and a negative lens, when the value is greater than the low limits in conditional expressions (1) and (5), the refractive index difference becomes greater between lenses of the three-element cemented lens and it is possible to increase the curvature radius of the cemented surface and suppress low the deficient spherical aberrations that occur here. Further, it is more preferable to satisfy conditional expressions (3) and (7). Specifically, when a lens material of high refractive index is used for the outermost lenses of the three-element cemented lens as shown in conditional expressions (9) and (17), it is possible to effectively correct aberrations such as spherical aberration and coma and to lessen the Petzval sum. Therefore, it is also possible to suppress the curvature of field low. Further, it is more preferable to satisfy conditional expressions (11) and (19). Meanwhile, when the values in conditional expressions (2), (6), (10), (14), and (18) are satisfied, it is possible to fully correct the axial chromatic aberrations and lateral chromatic aberration that occur in the second lens group. If the Abbe's number difference is too small between lenses in the three-element cemented lens, the axial chromatic aberration that makes the g-line under the d-line becomes too big. This greatly increases the lateral chromatic aberration that the g-line reaches a lower image height than the d-line. This is reversed when the Abbe's number difference between lenses is too big. Both cases are not preferable. It is more preferable to satisfy conditional expressions (4), (8), (12), (16), and (20).

Conditional expression (21) defines a relationship between the refractive power of the three-element cemented lens in the second lens group and the refractive power of the second lens group. When the value of conditional expression (21) is more than the lower limit, it never happens that the power of the three-element cemented lens becomes too great, that the decentration error sensitivity, the lens figure error sensitivity, the lens thickness, and the distance error sensitivity of the three-element cemented lens in the second lens group and lens in the other group become too great, and that the lens production is reduced. Meanwhile, if the value of conditional expression (21) is less than the higher limit, it never happens that the power of the three-element cemented lens goes too small, that the second lens group becomes too thick, and that the lens system is not downsized. Further, it is more preferable to satisfy conditional expression (22).

Next, in the case that the second lens group comprises a three-element cemented lens only, the three-element cemented lens must contain both a surface which contributes to a positive refractive power and a surface which contributes to a negative refractive power to correct aberrations in good balance. Since this invention has positive, positive, negative, and negative surface powers in the order from the object side, the height of light rays that pass through the negative power surface can be made low. This can reduce the Petzval sum and consequently suppress the image surface curvature. When the three-element cemented lens has a refractive index difference given in conditional expressions (23) and (27) and the lens of the three-element cemented lens which is nearest to the object side is a positive meniscus lens projected to the object side, both the above power disposition and good correction of aberration can be accomplished. Further, when the lenses have different refractive indexes as shown in conditional expressions (23) and (27), the curvature radius of the cemented surfaces can be made greater. This can effectively correct deficient spherical aberrations which occur on positive power surfaces and excessive spherical aberrations which occur on the negative power surface. Further, it is more preferable to satisfy conditional expressions (25) and (29). Further, as shown in conditional expressions (31), (35), and (39), it is possible to reduce the Petzval sum and suppress the image surface curvature low by increasing the refractive indexes of lenses which contribute to positive power and reducing the refractive indexes of lenses which contribute to negative power. Further, it is more preferable to satisfy conditional expressions (33), (37), and (41).

As long as conditional expressions (24), (28), (32), (36), and (40) are satisfied, it is possible to effectively correct axial chromatic aberrations and lateral chromatic aberration which occur in the second lens group. If the Abbe's number difference of lenses in the three-element cemented lens is too small, the chromatic aberration that makes the g-line under the d-line becomes too big. As the result, the lateral chromatic aberration that the g-line reaches lower image height than the d-line becomes too big. If the Abbe's number difference is too big, this case is reversed and not preferable. It is more preferable to satisfy conditional expressions (26), (30), (34), (38), and (42).

When conditional expression (43) is satisfied, it is possible to increase the refractive index of the negative lens in the first lens group. This can make the curvature of a lens smaller than that of a lens material of low refractive index even when the power of the lens becomes greater when the lens system is made compact. As the result, it is possible to reduce the distortion aberration and astigmatism of this lens.

Conditional expression (44) defines a relationship between the refractive power of the total lens system at the wide-angle end and the refractive power of the third lens group. When the value of conditional expression (44) is more than the lower limit, it never happens that the power of the third lens group becomes too small, that the quantity of lens movement for focusing becomes too much, and that the lens system becomes thick. Meanwhile, the value of conditional expression (44) which is less than the higher limit can suppress the power of the third lens group and the deterioration of the optical performance due to the distortion and astigmatism that occur in this group, lens decentration error, lens figure error, and lens thickness and lens distance errors. As the result, a good optical performance can be assured. Further, when this lens group is made of plastic lenses, the image plane shift can be suppressed when temperature varies. It is more preferable to satisfy conditional expression (45).

Conditional expression (46) defines a relationship between the sum of axial thicknesses of lens groups and the diagonal length of the image-pickup device. When the value of conditional expression (46) is more than the lower limit, the lens thickness is not too small. This can suppress the deterioration of the optical performance due to the lens decentration error, lens figure error, and lens thickness and lens distance errors. As the result, a good optical performance can be assured. When the value of conditional expression (46) is less than the higher limit, it never happens that the lens thickness becomes too big and that the lens system is not down-sized. Further, it is more preferable to satisfy conditional expression (47).

Further, the second lens group has a three-element cemented lens which includes positive lens c1, negative lens c2 and positive lens c3, and a single negative lens in this order when viewed from the object side. Therefore, this zoom lens system can suppress the paraxial values such as focal lengths and back-focus and aberration changes due to the thickness of the three-element cemented lens more than the conventional zoom lens systems. Accordingly, the thickness of a three-element cemented lens system can be easily controlled in production.

Furthermore, it is possible to reduce the ray height of a negative lens, lessen the Petzval sum, and suppress the curvature of field by arranging the second lens group with a three-element cemented lens having a positive refractive power and a lens with a negative refractive power in the order from the object side. If a three-element cemented lens is not used when the second lens group is constituted by 4 lenses, the second lens group is decomposed into three or more lens elements, which increases error factors such as lens decentration and lens distance variation. Particularly, when the second lens group is made thinner for compactness, sensitivities of each lens element such as decentration error sensitivity, figure error sensitivity, and thickness and distance error sensitivity become greater. To prevent this, each lens must have the centering accuracy, figure accuracy, and axial positioning accuracy improved extremely. This reduces the lens productivity. Contrarily, when a three-element cemented lens is used, the lens manufacturer has only to manage two lens elements substantially and can comparatively increase the lens productivity. In this way, the three-element cemented lens can suppress aberrations of the second lens group and consequently can reduce aberration changes in zooming. Further, when the second lens group is constituted by a three-element cemented lens only, it is preferable to optimize the refractive index and figure of the lens material in order to provide a surface of a negative refractive power in the cemented lens. With this, the zoom lens system can have both good correction of aberrations and compactness.

Further, when the lens surface positioned closest to the object of the second lens group is closest to the diaphragm and the lens system rather works to correct spherical aberration and coma. Therefore, the aberrations can be better corrected when this lens surface is made aspheric. However, it is preferable to fully reduce the surface undulation error (aspherical surface error) which is apt to occur on molded aspherical lenses since rays passing through this surface are comparatively thick axially and abaxially and this surface is most likely affected by the lens figure error. If the figure error sensitivity is high or the undulation error in lens production is hard to be reduced, it is preferable to use glass spherical lens which is polished at a comparative high figure accuracy for the lens closest to the object of the second lens group and place the aspherical lens closest to the image of the second lens group. When made of plastic resin, the aspheric lens can be lighter than glass lenses and manufactured cheaper. Naturally, excellent optical performances can be obtained also by making lenses of the second lens group to be aspherical on both object and image sides.

Further, it is possible to achieve a compact thin optical system with a front lens of a small diameter when the first lens group is constituted by two lenses of a negative lens and a positive lens in this order from the object side. When the first lens group is made with three lenses of a negative lens, a negative lens, and a positive lens in the order from the object side, negative powers of this lens group can be divided and made smaller. As the result, this lens group can correct a negative distortion and others that occur in this group, but this lens configuration becomes a little greater. Further, when using aspherical surfaces, the first lens group with less lens elements can correct distortion and astigmatism effectively. Further, when a glass spherical lens is combined with an aspheric surface resin, various lens materials can be used in comparison with the glass-molded lenses and plastic lenses. This can increase the effect of correcting various aberrations.

Furthermore, the aberration that occurs in the third lens group is not magnified in the succeeding optical path and hard to show up because no optical element with a power comes after the third lens group. Therefore, this group need not always use two positive and negative lenses for achromatization and the third lens-group may be constituted by only a positive lens because the third lens group has little influence on the optical performance of the whole optical system. Further, when using plastic lens which is lighter in weight than glass lens, this lens group can reduce a load on the barrel driving mechanism while the third lens group moves for zooming or focusing. When the third lens group uses plastic lens, the magnification of this group is comparatively small even when the shape or refractive index of the lens varies by a temperature change. Furthermore, since the heights of axial rays passing through this lens group are low and off-axis rays are thin, the focusing distance is comparatively small and the optical performance is reduced less. The use of plastic lenses will be effective to reduce the production cost of lenses. Naturally, excellent optical performances can be obtained also by using glass molded aspheric surfaces and hybrid aspheric surfaces for the third lens group.

This zoom lens system adopts a rear-focusing method which moves the third lens group toward the object side when focusing from an object at infinity to an object at close range. When using the first lens group to focus, the front lens must be greater to secure the relative illumination at a hyperfocal distance. However, this problem does not occur in focusing by the third lens group. Therefore, the lens system can be down-sized. Further, when the telephoto end of the third lens group is positioned nearer to the image side than the wide-angle end, the moving path required to focus from infinity point to hyperfocal point at the wide-angle end can be contained in the moving path required to focus at the telephoto end. Therefore, the lens driving mechanism can be down-sized.

This invention can provide an axially-thin zoom lens which has a wide field angle, a high power variation ratio, and optimum corrected aberrations.

BRIEF DESCRIPTION OF THE DRAWINGS

FIG. 2($a$-1) to FIG. 2($c$-3) are explanatory drawings of aberration curves such as spherical aberration, astigmatism, and distortion of a zoom lens of Embodiment 1;

FIG. 4($a$-1) to FIG. 4($c$-3) are explanatory drawings of aberration curves such as spherical aberration, astigmatism, and distortion of a zoom lens of Embodiment 2;

FIG. 6(*a*-1) to FIG. 6(*c*-3) are explanatory drawings of aberration curves such as spherical aberration, astigmatism, and distortion of a zoom lens of Embodiment 3;

FIG. 8(*a*-1) to FIG. 8(*c*-3) are explanatory drawings of aberration curves such as spherical aberration, astigmatism, and distortion of a zoom lens of Embodiment 4;

FIG. 10(*a*-1) to FIG. 10(*c*-3) are explanatory drawings of aberration curves such as spherical aberration, astigmatism, and distortion of a zoom lens of Embodiment 5;

FIG. 12(*a*-1) to FIG. 12(*c*-3) are explanatory drawings of aberration curves such as spherical aberration, astigmatism, and distortion of a zoom lens of Embodiment 6.

DETAILED DESCRIPTION OF THE PREFERRED EMBODIMENT

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. Symbols used for Embodiments are as follows:

f: Focal length of a total zoom lens system
R: Curvature radius
d: Axial distance between surfaces
$n_d$: Refractive index to d-line of lens material
$\nu_d$: Abbe's number of lens material A form of an aspheric surface in each embodiment is expressed by the following Formula (1) assuming that a vertex of the surface is the origin, the X-axis is taken along an optical axis and h represents a height in the direction perpendicular to the optical axis.

$$X = \frac{h^2/R}{1 + \sqrt{1 - (1+K)h^2/R^2}} + \sum A_i h^i \quad \text{[Formula 1]}$$

where
$A_i$ is an aspheric coefficient of the i-th order;
R is a radius of curvature;
K is a conic constant.

In the following description (including lens data in Tables), 10 to the n power (e.g. 2.5×10-02) is expressed by E (e.g., 2.5E-02).

Embodiment 1

Figure 1:
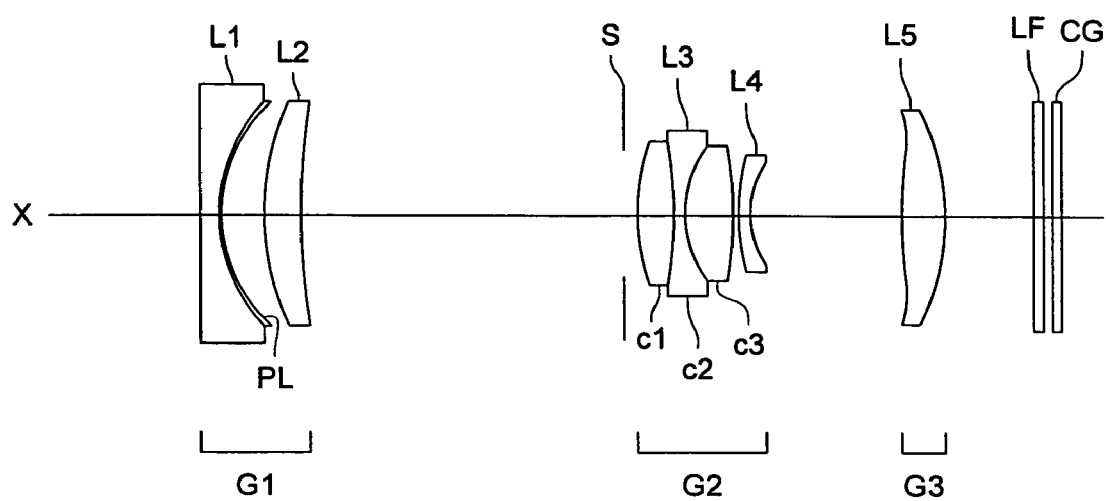
FIG. 1 is a sectional view of a zoom lens of Embodiment 1 at the wide-angle end.

Table 1 lists lens data of the zoom lens system in accordance with Embodiment 1. FIG. 1 shows a sectional view of a zoom lens of Embodiment 1 at the wide-angle end. FIG. 2(*a*-1) to 2(*c*-3) are explanatory drawings of aberration curves such as spherical aberration, astigmatism, and distortion of a zoom lens of Embodiment 1. FIG. 2(*a*-1) to 2(*a*-3) show aberration curves of the zoom lens at the wide-angled end. FIG. 2(*b*-1) to 2(*b*-3) show aberration curves at an intermediate position. FIG. 2(*c*-1) to 2(*c*-3) show aberration curves of the zoom lens at the telephoto end. In the following aberration diagrams, solid lines represent d-lines and dotted lines represent g-lines. In the astigmatism diagrams, solid lines represent sagittal image surface and dotted lines represent meridional image surfaces.

TABLE 1

| Embodiment 1 | | | | |
|---|---|---|---|---|
| Surface number | R (mm) | d (mm) | $n_d$ | $\nu_d$ |
| 1 | 153.079 | 0.95 | 1.88300 | 40.8 |
| 2 | 7.847 | 0.05 | 1.51313 | 53.9 |
| 3 | 6.691 | 2.02 | | |
| 4 | 11.862 | 1.89 | 1.84666 | 23.8 |
| 5 | 43.804 | d1 (variable) | | |
| 6 | 8.567 | 1.74 | 1.76802 | 49.2 |
| 7 | −32.146 | 0.45 | 1.60342 | 38.0 |
| 8 | 5.047 | 2.34 | 1.72916 | 54.7 |
| 9 | −44.729 | 0.26 | | |
| 10 | 10.109 | 0.55 | 1.71736 | 29.5 |
| 11 | 4.431 | d2 (variable) | | |
| 12 | 29.514 | 2.00 | 1.52500 | 56.0 |
| 13 | −23.000 | d3 (variable) | | |
| 14 | ∞ | 0.39 | 1.54880 | 67.0 |
| 15 | ∞ | 0.43 | | |
| 16 | ∞ | 0.50 | 1.51633 | 64.1 |
| 17 | ∞ | | | |

Aspheric surface coefficient

3rd surface

K = 0.0
A4 = −4.45820E−04
A6 = −1.50800E−06
A8 = −2.55440E−07
A10 = 2.54860E−09
A12 = −5.73170E−11
A14 = 2.53150E−13

6th surface

K = 0.0
A4 = −3.30860E−04
A6 = 2.09690E−06
A8 = −7.69700E−07
A10 = 4.48740E−08
A12 = −1.01850E−09

12th surface

K = 0.0
A4 = −2.83790E−04
A6 = −1.57390E−05
A8 = −8.91940E−07
A10 = −1.61440E−08
A12 = 1.10440E−09
A14 = −2.68670E−11

13th surface

K = 0.0
A4 = −2.42990E−04
A6 = 1.26960E−05
A8 = −9.73340E−07

TABLE 1-continued

A10 = 7.64270E−09
A12 = −1.34620E−10
A14 = −1.07060E−12

| f | d1 | d2 | d3 |
|---|----|----|----|
| 8.14 | 15.505 | 7.016 | 4.307 |
| 14.10 | 6.470 | 13.650 | 3.603 |
| 22.93 | 1.908 | 22.801 | 2.100 |

Diaphragm position: 0.50 mm before the 6th lens
Image plane shift due to the temperature variation of the plastic lens

| f | | |
|---|---|---|
| 8.14 | 14.10 | 22.93 |

| | | | |
|---|---|---|---|
| Image plane shift | 0.010 | 0.007 | 0.003 |

Image plane shift: d-line value at ordinary temperature +30° C.

The zoom lens of Embodiment 1 consists of first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains positive lens L1 which is a hybrid aspheric lens having thin aspheric plastic layer PL in the image side and positive lens L2 in the order from the object side. The second lens group G2 includes three-element cemented lens L3 which are glass-molded lenses of positive lens c1, negative lens c2, and positive lens c3 and negative lens L4. The third lens group G3 contains positive lens L5 (three-element lens) which is a plastic aspheric lens. Low-pass filter LF and cover glass CG are provided between positive lens L5 and an image-pickup device which is not shown in the drawing.

As the lens system zooms from the wide-angle end to the telephoto end, first lens group G1 moves towards the image side along the optical axis and then moves back towards the object side. Second lens group G2 moves towards the object side along the optical axis. Third lens group G3 moves toward the image side along the optical axis.

Embodiment 2

Figure 3:
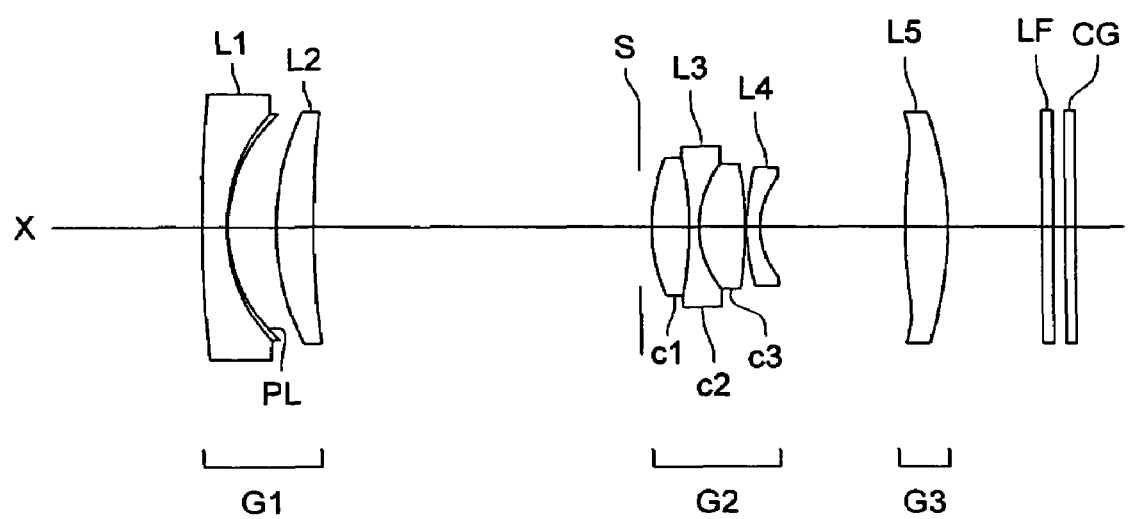
FIG. 3 is a sectional view of a zoom lens of Embodiment 2 at the wide-angle end.

Table 2 lists lens data of the zoom lens system in accordance with Embodiment 2. FIG. 3 shows a sectional view of a zoom lens of Embodiment 2 at the wide-angle end. FIG. 4(*a*-1) to 4(*c*-3) are explanatory drawings of aberration curves such as spherical aberration, astigmatism, and distortion of a zoom lens of Embodiment 2. FIG. 4(*a*-1) to 4(*a*-3) show aberration curves of the zoom lens at the wide-angle end. FIG. 4(*b*-1) to 4(*b*-3) show aberration curves at an intermediate position. FIG. 4(*c*-1) to 4(*c*-3) show aberration curves of the zoom lens at the telephoto end.

TABLE 2

Embodiment 2

| Surface number | R (mm) | d (mm) | $n_d$ | $v_d$ |
|---|---|---|---|---|
| 1 | 87.722 | 0.95 | 1.81600 | 46.6 |
| 2 | 7.915 | 0.05 | 1.51313 | 53.9 |
| 3 | 6.920 | 2.33 | | |
| 4 | 11.631 | 1.73 | 1.84666 | 23.8 |
| 5 | 27.306 | d1 (variable) | | |
| 6 | 8.232 | 1.71 | 1.76802 | 49.2 |
| 7 | −47.856 | 0.45 | 1.60342 | 38.0 |
| 8 | 4.928 | 2.14 | 1.72916 | 54.7 |
| 9 | −58.967 | 0.20 | | |
| 10 | 9.918 | 0.55 | 1.71736 | 29.5 |
| 11 | 4.389 | d2 (variable) | | |
| 12 | 30.106 | 1.90 | 1.69350 | 53.2 |
| 13 | −33.255 | d3 (variable) | | |
| 14 | ∞ | 0.43 | 1.54880 | 67.0 |
| 15 | ∞ | 0.39 | | |
| 16 | ∞ | 0.50 | 1.51633 | 64.1 |
| 17 | ∞ | | | |

Aspheric surface coefficient

3rd surface

K = 0.0
A4 = −3.37440E−04
A6 = −2.06160E−06
A8 = −7.82550E−08
A10 = −4.10310E−09
A12 = 1.09160E−10
A14 = −1.38420E−12

6th surface

K = 0.0
A4 = −3.29970E−04
A6 = 1.73390E−06
A8 = −6.35460E−07
A10 = 2.75960E−08
A12 = −3.68100E−10

12th surface

K = 0.0
A4 = −5.48100E−05
A6 = 8.11020E−06
A8 = −5.52350E−07
A10 = −1.81340E−08
A12 = 1.13910E−09
A14 = −1.92220E−11

13th surface

K = 0.0
A4 = −2.14390E−05
A6 = 9.05050E−06
A8 = −1.03940E−06
A10 = 1.81830E−08
A12 = −1.21640E−10
A14 = −9.57390E−13

| f | d1 | d2 | d3 |
|---|----|----|----|
| 8.14 | 15.567 | 6.933 | 4.578 |
| 13.64 | 6.804 | 13.199 | 3.935 |
| 22.93 | 1.911 | 23.052 | 2.100 |

Diaphragm position: 0.50 mm before the 6th lens

The zoom lens of Embodiment 2 has first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains positive lens L1 which is a hybrid aspheric lens having thin aspheric plastic layer PL in the image side and positive lens L2 in the order from the object side. The second lens group G2 includes three-element cemented lens L3 which are glass-molded lenses of positive lens c1, negative lens c2, and positive lens c3 and negative lens L4. The third lens group G3 contains positive lens L5 (three-element lens) which is a plastic aspheric lens. Low-pass filter LF and cover glass CG are provided between positive lens L5 and an image-pickup device which is not shown in the drawing.

As the lens system zooms from the wide-angle end to the telephoto end, first lens group G1 moves towards the image side along the optical axis and then moves back towards the object side. Second lens group G2 moves towards the object side along the optical axis. Third lens group G3 moves towards the image side along the optical axis.

Embodiment 3

Figure 5:
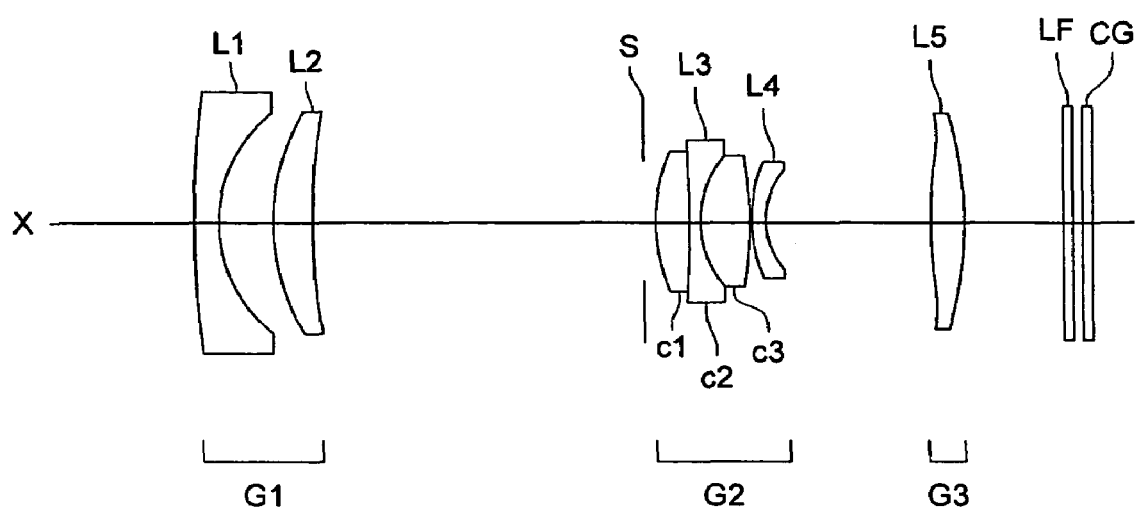
FIG. 5 is a sectional view of a zoom lens of Embodiment 3 at the wide-angle end.

Table 3 lists lens data of the zoom lens system in accordance with Embodiment 3. FIG. 5 shows a sectional view of a zoom lens of Embodiment 3 at the wide-angle end. FIG. 6(a-1) to 6 (c-3) are explanatory drawings of aberration curves such as spherical aberration, astigmatism, and distortion of a zoom lens of Embodiment 3. FIG. 6(a-1) to 6(a-3) show aberration curves of the zoom lens at the wide-angle end. FIG. 6(b-1) to 6(b-3) show aberration curves at an intermediate position. FIG. 6(c-1) to 6(c-3) show aberration curves of the zoom lens at the telephoto end.

TABLE 3

Embodiment 3

| Surface number | R (mm) | d (mm) | $n_d$ | $v_d$ |
|---|---|---|---|---|
| 1 | 52.794 | 0.95 | 1.81600 | 46.6 |
| 2 | 6.764 | 2.40 | | |
| 3 | 10.970 | 1.76 | 1.84666 | 23.8 |
| 4 | 23.614 | d1 (variable) | | |
| 5 | 7.702 | 1.50 | 1.69350 | 53.2 |
| 6 | −200.000 | 0.55 | 1.60342 | 38.0 |
| 7 | 5.275 | 2.20 | 1.72916 | 54.7 |
| 8 | −37.040 | 0.20 | | |
| 9 | 9.270 | 0.60 | 1.71736 | 29.5 |
| 10 | 4.352 | d2 (variable) | | |
| 11 | 26.040 | 1.55 | 1.69350 | 53.2 |
| 12 | −47.694 | d3 (variable) | | |
| 13 | ∞ | 0.40 | 1.54880 | 67.0 |
| 14 | ∞ | 0.39 | | |
| 15 | ∞ | 0.50 | 1.51633 | 64.1 |
| 16 | ∞ | | | |

Aspheric surface coefficient

2nd surface

K = 0.00000E+00
A4 = −2.15460E−04
A6 = −3.75730E−06
A8 = −3.42410E−09
A10 = −3.14210E−09

5th surface

K = 0.00000E+00
A4 = −3.85480E−04
A6 = −3.45420E−06
A8 = −1.35730E−07
A10 = −9.19060E−11

11th surface

K = 0.00000E+00
A4 = 6.86820E−05
A6 = 1.80630E−06
A8 = −5.00410E−07
A10 = −7.44380E−10

12th surface

K = 0.00000E+00
A4 = 7.59540E−05
A6 = 2.00080E−06

TABLE 3-continued

A8 = −6.93940E−07
A10 = 4.33960E−09

| f | d1 | d2 | d3 |
|---|---|---|---|
| 8.12 | 15.482 | 7.397 | 4.518 |
| 13.64 | 6.656 | 13.467 | 4.024 |
| 22.94 | 2.100 | 23.697 | 1.690 |

Diaphragm position: 0.50 mm before the 5th lens

The zoom lens of Embodiment 3 comprises first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains negative lens L1 which is an aspheric lens and positive lens L2 in the order from the object side. The second lens group G2 includes three-element cemented lens L3 which are glass-molded lenses of positive lens c1, negative lens c2, and positive lens c3 and negative lens L4. The third lens group G3 contains positive lens L5 (three-element lens) which is a glass aspheric lens. Low-pass filter LF and cover glass CG are provided between positive lens L5 and an image-pickup device which is not shown in the drawing.

As the lens system zooms from the wide-angle end to the telephoto end, first lens group G1 moves towards the image side along the optical axis and then moves back towards the object side. Second lens group G2 moves towards the object side along the optical axis. Third lens group G3 moves towards the image side along the optical axis.

Embodiment 4

Figure 7:
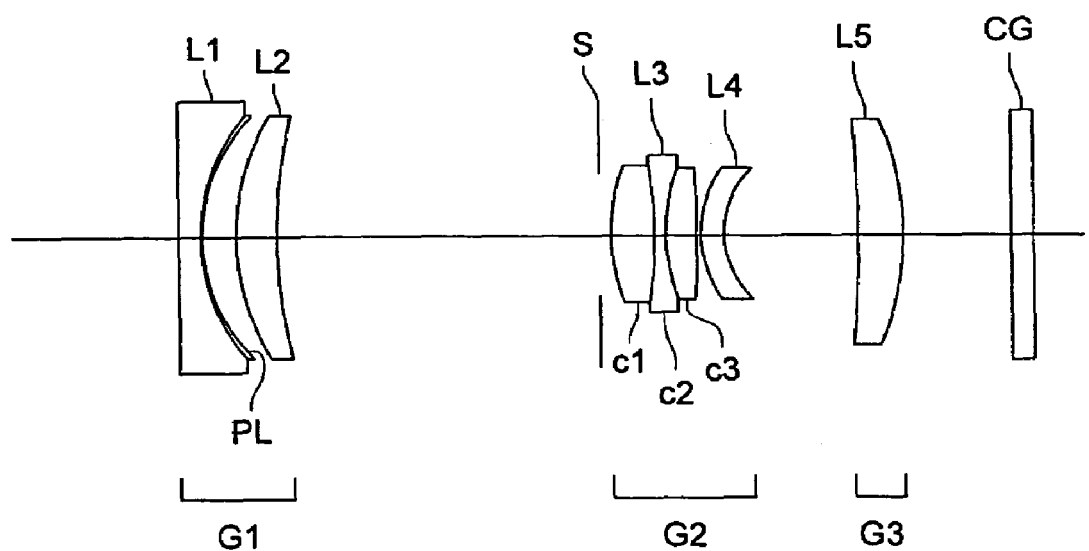
FIG. 7 is a sectional view of a zoom lens of Embodiment 4 at the wide-angle end.

Table 4 lists lens data of the zoom lens system in accordance with Embodiment 4. FIG. 7 shows a sectional view of a zoom lens of Embodiment 4 at the wide-angle end. FIG. 8(a-1) to 8(b-3) are explanatory drawings of aberration curves such as spherical aberration, astigmatism, and distortion of a zoom lens of Embodiment 4. FIG. 8(a-1) to 8(a-3) show aberration curves of the zoom lens at the wide-angle end. FIG. 8(b-1) to 8(b-3) show aberration curves at an intermediate position. FIG. 8(c-1) to 8 (c-3) show aberration curves of the zoom lens at the telephoto end.

TABLE 4

Embodiment 4

| Surface number | R (mm) | d (mm) | $n_d$ | $v_d$ |
|---|---|---|---|---|
| 1 | 8590.024 | 0.95 | 1.77250 | 49.6 |
| 2 | 8.371 | 0.05 | 1.50706 | 53.6 |
| 3 | 7.106 | 1.40 | | |
| 4 | 9.486 | 1.80 | 1.84666 | 23.8 |
| 5 | 17.858 | d1 (variable) | | |
| 6 | 8.368 | 1.90 | 1.77250 | 49.6 |
| 7 | −19.831 | 0.50 | 1.75520 | 27.5 |
| 8 | 8.008 | 1.30 | 1.80400 | 46.6 |
| 9 | 105.344 | 0.20 | | |
| 10 | 4.121 | 1.00 | 1.52500 | 56.0 |
| 11 | 3.115 | d2 (variable) | | |
| 12 | −94.412 | 1.90 | 1.52500 | 56.0 |
| 13 | −11.571 | d3 (variable) | | |
| 14 | ∞ | 1.00 | 1.51633 | 64.1 |
| 15 | ∞ | | | |

TABLE 4-continued

3rd surface

K = 0.00000E+00
A4 = −1.65190E−04
A6 = −3.00790E−06
A8 = 1.07550E−08
A10 = −2.08580E−09

10th surface

K = 0.00000E+00
A4 = −1.64040E−03
A6 = −1.01810E−04
A8 = −7.19310E−06
A10 = −1.86610E−07

11th surface

K = 0.00000E+00
A4 = −2.31760E−03
A6 = −2.76870E−04
A8 = −7.86160E−06
A10 = −3.97570E−06

13th surface

K = 0.00000E+00
A4 = 4.18000E−04
A6 = −2.34600E−06
A8 = −1.16310E−07
A10 = 2.47860E−09

| f | d1 | d2 | d3 |
|---|---|---|---|
| 8.12 | 14.47 | 5.87 | 4.65 |
| 13.72 | 6.59 | 11.89 | 3.72 |
| 23.09 | 1.80 | 20.54 | 2.64 |

Diaphragm position: 0.50 mm before the 6th lens
Image plane shift due to the temperature variation of the plastic lens

| f | Image plane shift |
|---|---|
| 8.12 | −0.015 |
| 13.72 | −0.046 |
| 23.09 | −0.118 |

Image plane shift: d-line value at ordinary temperature +30° C.

The zoom lens of Embodiment 4 comprises first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains negative lens L1 which is a hybrid aspheric lens having thin aspheric plastic layer PL in the image side and positive lens L2 in the order from the object side. The second lens group G2 includes three-element cemented lens L3 which are positive lens c1, negative lens c2, and positive lens c3 and negative lens L4 which is a plastic aspheric lens. The third lens group G3 contains positive lens L5 (three-element lens) which is a plastic aspheric lens. Low-pass filter LF and cover glass CG which are drawn with the same thickness are provided between positive lens L5 and an image-pickup device.

As the lens system zooms from the wide-angle end to the telephoto end, first lens group G1 moves towards the image side along the optical axis and then moves back towards the object side. Second lens group G2 moves towards the object side long the optical axis. Third lens group G3 moves towards the image side along the optical axis.

Embodiment 5

Figure 9:
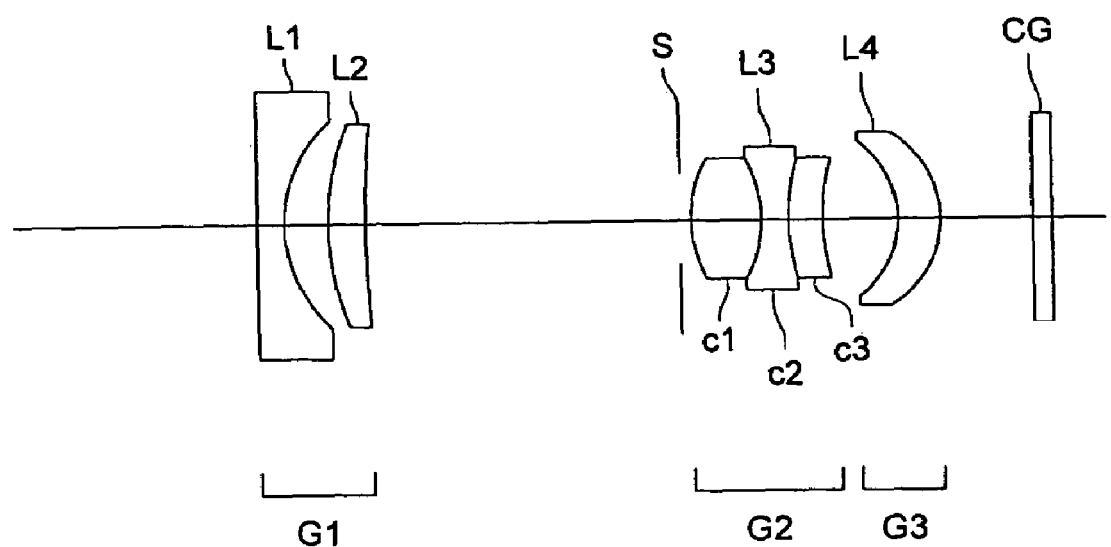
FIG. 9 is a sectional view of a zoom lens of Embodiment 5 at the wide-angle end.

Table 5 lists lens data of the zoom lens system in accordance with Embodiment 5. FIG. 9 shows a sectional view of zoom lens of Embodiment 5 at the wide-angle end. FIG. 10(*a*-1) to 10(*c*-3) are explanatory drawings of aberration 10(*a*-3) curves such as spherical aberration, astigmatism, and distortion of a zoom lens of Embodiment 5. FIG. 10(*b*-1) to show aberration curves of the zoom lens at the wide-angle end. FIG. 10(*b*-1) to 10(*b*-3) show aberration curves at an intermediate position. FIG. 10(*c*-1) to 10(*b*-3) show aberration curves of the zoom lens at the telephoto end.

TABLE 5

Embodiment 5

| Surface number | R (mm) | d (mm) | $n_d$ | $v_d$ |
|---|---|---|---|---|
| 1 | −124.991 | 1.00 | 1.80400 | 46.6 |
| 2 | 5.614 | 1.86 | | |
| 3 | 13.303 | 1.70 | 1.84666 | 23.8 |
| 4 | 374.802 | d1 (variable) | | |
| 5 | 5.981 | 2.95 | 1.83481 | 42.7 |
| 6 | −6.023 | 1.00 | 1.80518 | 25.4 |
| 7 | 9.921 | 1.50 | 1.62299 | 58.2 |
| 8 | 12.255 | d2 (variable) | | |
| 9 | −9.823 | 1.70 | 1.52500 | 56.0 |
| 10 | −5.147 | d3 (variable) | | |
| 11 | ∞ | 1.00 | 1.51633 | 64.1 |
| 12 | ∞ | | | |

2nd surface

K = −4.10370E+00
A4 = 2.09150E−03
A6 = −7.59090E−05
A8 = 2.03940E−06
A10 = −2.55060E−08

5th surface

K = −4.46030E−01
A4 = 2.42630E−04
A6 = 1.42950E−05
A8 = 7.58960E−07
A10 = −2.48640E−07

8th surface

K = 0.00000E+00
A4 = 2.54050E−03
A6 = 9.17370E−05
A8 = 1.12390E−05
A10 = −7.45300E−07

9th surface

K = 0.00000E+00
A4 = −3.82820E−03
A6 = −2.22770E−05
A8 = −7.44580E−07
A10 = −1.08210E−06

10th surface

K = 0.00000E+00
A4 = −1.13490E−03
A6 = −1.77500E−05

TABLE 5-continued

A8 = 2.20980E−06
A10 = −4.03260E−07

| f | d1 | d2 | d3 |
|---|---|---|---|
| 5.20 | 13.68 | 3.20 | 3.92 |
| 8.63 | 5.39 | 6.24 | 3.97 |
| 14.40 | 1.00 | 12.24 | 2.83 |

Diaphragm position: 0.50 mm before the 5th lens
Image plane shift due to the temperature variation of the plastic lens

| f | Image plane shift |
|---|---|
| 5.20 | +0.007 |
| 8.63 | +0.007 |
| 14.40 | +0.002 |

Image plane shift: d-line value at ordinary temperature +30° C.

The zoom lens of Embodiment 5 comprises first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains negative lens L1 which is a glass aspheric lens and positive lens L2 in the order from the object side. The second lens group G2 includes three-element cemented lens L3 which are positive glass aspheric lens c1, negative lens c2 and positive c3 glass aspheric lens. The third lens group G3 contains positive lens L4 (three-element lens) which is a plastic aspheric lens. Low-pass filter LF and cover glass CG which are drawn with the same thickness are provided between positive lens L4 and an image-pickup device (which is not shown in the drawing).

As the lens system zooms from the wide-angle end to the telephoto end, first lens group G1 moves towards the image side along the optical axis and then moves back towards the object side. Second lens group G2 moves towards the object side along the optical axis. Third lens group G3 moves towards the image side along the optical axis.

Embodiment 6

Figure 11:
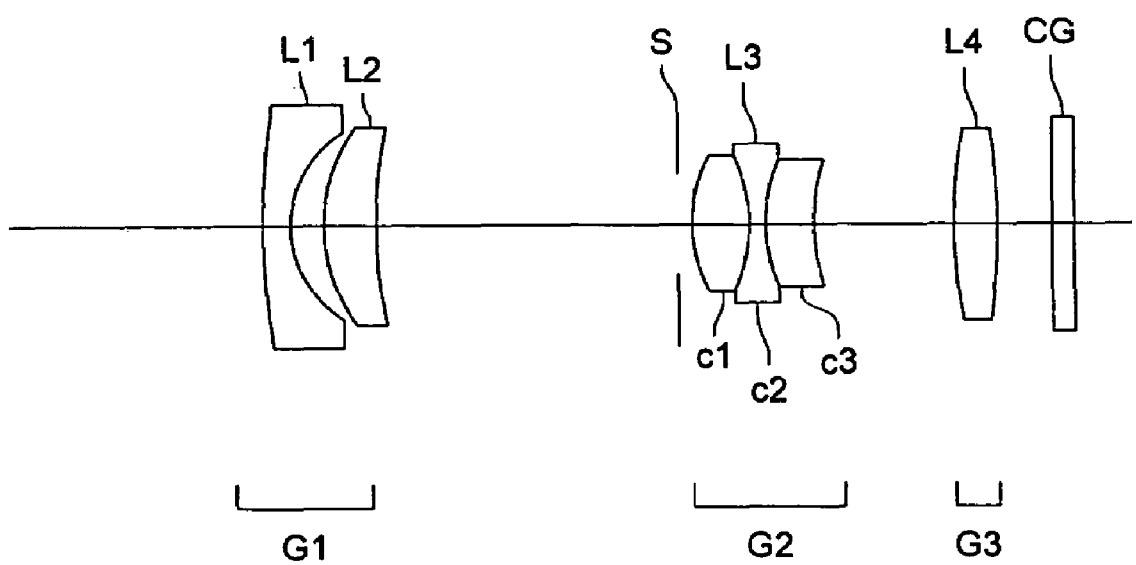
FIG. 11 is a sectional view of a zoom lens of Embodiment 6 at the wide-angle end.

Table 6 lists lens data of the zoom lens system in accordance with Embodiment 6. FIG. 11 shows a sectional view of a zoom lens of Embodiment 6 at the wide-angle end. FIG. 12(a-1) to 12(c-3) are explanatory drawings of aberration curves such as spherical aberration, astigmatism, and distortion of a zoom lens of Embodiment 6. FIG. 12(a-1) to 12(a-3) show aberration curves of the zoom lens at the wide-angle end. FIG. 12(b-1) to 12(b-3) show aberration curves at an intermediate position. FIG. 12(c-1) to 12(c-3) show aberration curves of the zoom lens at the telephoto end.

TABLE 6

Embodiment 6

| Surface number | R (mm) | d (mm) | $n_d$ | $v_d$ |
|---|---|---|---|---|
| 1 | 48.205 | 1.00 | 1.83481 | 42.7 |
| 2 | 4.239 | 1.31 | | |
| 3 | 7.141 | 2.19 | 1.84666 | 23.8 |
| 4 | 17.620 | d1 (variable) | | |
| 5 | 5.417 | 2.41 | 1.77250 | 49.6 |
| 6 | −7.023 | 0.56 | 1.72825 | 28.5 |
| 7 | 5.983 | 2.10 | 1.52000 | 29.8 |
| 8 | 24.086 | d2 (variable) | | |
| 9 | 26.216 | 1.70 | 1.52500 | 56.0 |
| 10 | −23.583 | d3 (variable) | | |
| 11 | ∞ | 1.00 | 1.51633 | 64.1 |
| 12 | ∞ | | | |

2nd surface

K = −1.64670E+00
A4 = 1.66030E−03
A6 = −9.33800E−06
A8 = 1.76600E−07
A10 = −2.74440E−09

5th surface

K = −2.74410E−01
A4 = 1.37190E−04
A6 = 1.07310E−05
A8 = 3.90790E−07
A10 = −1.58040E−07

8th surface

K = 0.00000E+00
A4 = 3.24540E−03
A6 = 2.40520E−05
A8 = 3.60230E−05
A10 = −2.39490E−06

9th surface

K = 0.00000E+00
A4 = −4.81270E−04
A6 = 4.37180E−05
A8 = −2.70620E−06
A10 = 6.68450E−08

10th surface

K = 0.00000E+00
A4 = 5.56330E−04
A6 = 6.70450E−05
A8 = −3.29490E−06
A10 = 9.21820E−08

| f | d1 | d2 | d3 |
|---|---|---|---|
| 5.18 | 12.79 | 5.58 | 2.15 |
| 8.59 | 6.49 | 9.24 | 1.98 |
| 14.35 | 2.79 | 15.52 | 1.30 |

Diaphragm position: 0.50 mm before the 5th lens
Image plane shift due to the temperature variation of the plastic lens

| f | Image plane shift |
|---|---|
| 5.18 | +0.001 |
| 8.59 | +0.000 |
| 14.35 | −0.001 |

Image plane shift: d-line value at ordinary temperature +30° C.

The zoom lens of Embodiment 6 comprises first lens group G1 with a negative refractive power, aperture stop S, second lens group G2 with a positive refractive power, and third lens group G3 with a positive refractive power in the order from the object side along optical axis X. When the lens system zooms from the wide-angle end to the telephoto end, distances between lens groups are varied. The first lens group G1 contains negative lens L1 which is a glass aspheric lens and positive lens L2 in the order from the object side. The second lens group G2 includes three-element cemented lens L3 which are positive glass aspheric lens c1, negative lens c2 and positive glass aspheric lens c3. The third lens group G3 contains positive lens L4 (three-element lens) which is a plastic aspheric lens. Low-pass filter LF and cover glass CG which are drawn with the same thickness are provided between positive lens L4 and an image-pickup device (which is not shown in the drawing).

As the lens system zooms from the wide-angle end to the telephoto end, first lens group G1 moves towards the image side along the optical axis and then moves back towards the object side. Second lens group G2 moves towards the object side along the optical axis. Third lens group G3 moves towards the image side along the optical axis.

Table 7 list lens data of the Embodiments for the above conditional expressions.

TABLE 7

|  | $n_{c1} - n_{c2}$ | $v_{c1} - v_{c2}$ | $n_{c3} - n_{c2}$ | $v_{c3} - v_{c2}$ | $n_{c1}$ | $v_{c1}$ |
|---|---|---|---|---|---|---|
| Embodiment 1 | 0.16 | 11.2 | 0.13 | 16.7 | 1.76802 | 49.2 |
| Embodiment 2 | 0.16 | 11.2 | 0.13 | 16.7 | 1.76802 | 49.2 |
| Embodiment 3 | 0.09 | 15.2 | 0.13 | 16.7 | 1.69350 | 53.2 |
| Embodiment 4 | 0.02 | 22.0 | 0.05 | 19.0 | 1.77250 | 49.6 |
| Embodiment 5 | 0.03 | 17.3 | −0.18 | 32.7 | 1.83481 | 42.7 |
| Embodiment 6 | 0.04 | 21.2 | −0.21 | 1.4 | 1.77250 | 49.6 |

|  | $n_{c2}$ | $v_{c2}$ | $n_{c3}$ | $v_{c3}$ | $f_c/f_2$ | $n_{1n}$ |
|---|---|---|---|---|---|---|
| Embodiment 1 | 1.60342 | 38.0 | 1.72916 | 54.7 | 0.58 | 1.88300 |
| Embodiment 2 | 1.60342 | 38.0 | 1.72916 | 54.7 | 0.57 | 1.81600 |
| Embodiment 3 | 1.60342 | 38.0 | 1.72916 | 54.7 | 0.58 | 1.81600 |
| Embodiment 4 | 1.75520 | 27.6 | 1.80400 | 46.6 | 0.88 | 1.77250 |
| Embodiment 5 | 1.80518 | 25.4 | 1.62299 | 58.1 | — | 1.80400 |
| Embodiment 6 | 1.72825 | 28.4 | 1.52029 | 29.8 | — | 1.83481 |

|  | $f_w/f_{3p}$ | SD/2Y |
|---|---|---|
| Embodiment 1 | 0.33 | 1.35 |
| Embodiment 2 | 0.35 | 1.32 |
| Embodiment 3 | 0.33 | 1.31 |
| Embodiment 4 | 0.33 | 1.23 |
| Embodiment 5 | 0.28 | 1.63 |
| Embodiment 6 | 0.21 | 1.57 |

What is claimed is:

1. A zoom lens system comprising, in the order from an object side:

(a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens and at least one negative lens, the three-element cemented lens comprising a positive lens c1, a negative lens c2, and a positive lens c3 in the order from the object side, and
   wherein the three-element cemented lens satisfies the following conditional expressions:

$$0.05 < n_{c3} - n_{c2}$$

$$5 < v_{c3} - v_{c2}$$

where $n_{c2}$ represents refractive index of the lens c2, $n_{c3}$ represents refractive index of the lens c3, $v_{c2}$ represents Abbe's number of the lens c2, and $v_{c3}$ represents Abbe's number of the lens c3.

2. A zoom lens system comprising, in the order from an object side:

(a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens and at least one negative lens, the three-element cemented lens comprising a positive lens c1, a negative lens c2, and a positive lens c3 in the order from the object side, and
   wherein the lens c3 satisfies the following conditional expressions:

$$1.60 < n_{c3} \quad (17)$$

$$40 < v_{c3} \quad (18)$$

where $n_{c3}$ represents refractive index of the lens c3, and $v_{c3}$ represents Abbe's number of the lens c3.

3. A zoom lens system comprising, in the order from an object side:

(a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens and at least one negative lens, the three-element cemented lens comprising a positive lens c1, a negative lens c2, and a positive lens c3 in the order from the object side, and
   wherein the three-element cemented lens satisfies the following conditional expression:

$$0.2 < f_c/f_2 < 1.2 \quad (21)$$

where $f_c$ represents a focal length of the three-element cemented lens, and $f_2$ represents a focal length of the second lens group.

4. A zoom lens system comprising, in the order from an object side:

(a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens and at least one negative lens, the three-element cemented lens comprising a positive lens c1, a negative lens c2, and a positive lens c3 in the order from the object side, and
   wherein at least a lens of the second lens group which is closest to an image side is a plastic lens.

5. A zoom lens system comprising, in the order from an object side:
   (a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group consists of a three-element cemented lens comprising a positive lens c1, a negative lens c2, and a positive lens c3 in the order from the object side.

6. The zoom lens system of claim 5, wherein the three-element cemented lens satisfies the following conditional expressions:

$$0 < n_{c1} - n_{c2}$$

$$5 < \nu_{c1} - \nu_{c2}$$

where $n_{c1}$ represents refractive index of the lens c1, $n_{c2}$ represents refractive index of the lens c2, $\nu_{c1}$ represents Abbe's number of the lens c1, and $\nu_{c2}$ represents Abbe's number of the lens c2.

7. The zoom lens system of claim 5, wherein the three-element cemented lens satisfies the following conditional expressions:

$$-0.05 > n_{c3} - n_{c2}$$

$$0 < \nu_{c3} - \nu_{c2}$$

where $n_{c2}$ represents refractive index of the lens c2, $n_{c3}$ represents refractive index of the lens c3, $\nu_{c2}$ represents Abbe's number of the lens c2, and $\nu_{c3}$ represents Abbe's number of the lens c3.

8. The zoom lens system of claim 5, wherein the lens c1 satisfies the following conditional expressions:

$$1.65 < n_{c1}$$

$$35 < \nu_{c1}$$

where $n_{c1}$ represents refractive index of the lens c1, and $\nu_{c1}$ represents Abbe's number of the lens c1.

9. The zoom lens system of claim 5, wherein the lens c2 satisfies the following conditional expressions:

$$1.65 < n_{c2} < 1.85$$

$$\nu_{c2} < 50$$

where $n_{c2}$ represents refractive index of the lens c2, and $\nu_{c2}$ represents Abbe's number of the lens c2.

10. The zoom lens system of claim 5, wherein the lens c3 satisfies the following conditional expressions:

$$1.70 > n_{c3}$$

$$65 > \nu_{c3}$$

where $n_{c3}$ represents refractive index of the lens c3, and $\nu_{c3}$ represents Abbe's number of the lens c3.

11. The zoom lens system of claim 5, wherein the lens c3 is a positive meniscus lens with convex surface thereof faced to the object side.

12. A zoom lens system comprising, in the order from an object side:
   (a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens comprising a positive lens c1, a negative lens c2, and a positive lens c3 in the order from the object side, and
   wherein the zoom lens satisfies the following conditional expression:

$$0.9 < SD/2Y < 2.0$$

where SD represents sum of axial thickness of the lens groups, and 2Y represents a diagonal length of an image-pickup device.

13. A zoom lens system comprising, in the order from an object side:
   (a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens comprising a positive lens c1, a negative lens c2, and a positive lens c3 in the order from the object side, and
   wherein the first lens group consists of one negative lens and one positive lens, and has at least one aspheric surface.

14. The zoom lens system of claim 13, wherein the aspheric surface of the first lens group is a hybrid aspheric surface which has an aspheric plastic layer on a spherical glass surface.

15. The zoom lens system of claim 13, wherein the negative lens of the first lens group satisfies the following conditional expression:

$$n_{1n} > 1.80$$

where $n_{1n}$ represents the refractive index of the negative lens.

16. A zoom lens system comprising, in the order from an object side:
   (a) a first lens group which has a negative refractive power;
   (b) a second lens group which has a positive refractive power; and
   (c) a third lens group which has a positive refractive power in the order from the object side,
   wherein power of the zoom lens system is varied from a wide-angle end to a telephoto end by changing distances among the lens groups,
   wherein the second lens group has a three-element cemented lens comprising a positive lens c1, a negative lens c2, and a positive lens c3 in the order from the object side, and
   wherein the third lens group consists of one positive lens.

17. The zoom lens system of claim 16, wherein the positive lens has at least one aspheric surface.

18. The zoom lens system of claim 16, wherein the positive lens is made of plastic and satisfies the following conditional expression:

$$0.1 < f_W/f_{3p} < 0.6$$

where $f_W$ represents focal length of the entire lens system at the wide-angle end, and $f_{3p}$ represents focal length of the positive lens.

19. The zoom lens system of claim 16, wherein the positive lens is made of plastic and satisfies the following conditional expression:

$$0.2 < f_W/f_{3p} < 0.4$$

where $f_W$ represents focal length of the entire lens system at the wide-angle end, and $f_{3p}$ represents focal length of the positive lens.

* * * * *